(12) United States Patent
Hardman

(10) Patent No.: US 10,453,452 B2
(45) Date of Patent: Oct. 22, 2019

(54) PILLOW REMOTE CONTROLLER USING ACOUSTIC COMMANDS

(71) Applicant: Raymond Henry Hardman, Honolulu, HI (US)

(72) Inventor: Raymond Henry Hardman, Honolulu, HI (US)

(*) Notice: Subject to any disclaimer, the term of this patent is extended or adjusted under 35 U.S.C. 154(b) by 115 days.

(21) Appl. No.: 15/675,565

(22) Filed: Aug. 11, 2017

(65) Prior Publication Data

US 2017/0345427 A1 Nov. 30, 2017

Related U.S. Application Data

(63) Continuation-in-part of application No. 14/757,237, filed on Dec. 10, 2015.

(Continued)

(51) Int. Cl.
| | |
|---|---|
| *G10L 15/22* | (2006.01) |
| *G08C 17/02* | (2006.01) |
| *G08C 23/04* | (2006.01) |
| *A47G 9/10* | (2006.01) |
| *G08C 23/02* | (2006.01) |
| *H04Q 9/00* | (2006.01) |

(Continued)

(52) U.S. Cl.
CPC ............ *G10L 15/22* (2013.01); *A47G 9/1045* (2013.01); *G08C 17/02* (2013.01); *G08C 23/02* (2013.01); *G08C 23/04* (2013.01); *H04Q 9/00* (2013.01); *H04W 4/38* (2018.02); *A47G 2009/006* (2013.01); *A47G 2200/143* (2013.01); *A47G 2200/146* (2013.01); *A47G 2200/20* (2013.01); *A47G 2200/226* (2013.01); *G08C 2201/31* (2013.01); *G08C 2201/51* (2013.01); *G08C 2201/92* (2013.01); *G10L 2015/223* (2013.01); *H04L 67/12* (2013.01); *H04W 4/80* (2018.02)

(58) Field of Classification Search
USPC .................................. 704/231–257, 270–275
See application file for complete search history.

(56) References Cited

U.S. PATENT DOCUMENTS

| | | | | |
|---|---|---|---|---|
| 5,774,859 | A | * | 6/1998 | Houser .............. H04N 5/44543 348/E5.103 |
| 5,838,223 | A | | 11/1998 | Gallant et al. |

(Continued)

*Primary Examiner* — Jesse S Pullias
(74) *Attorney, Agent, or Firm* — Christopher C. Dremann, P.C.; Christopher C. Dremann

(57) ABSTRACT

A pillow remote controller using acoustic commands includes a pillow defining an open interior compartment configured for housing one or more pressure sensors electrically and operably coupled with an electronics enclosure. The electronics enclosure contains various electronic components including a power control and alarm circuit, an audio receive, de-code and function command circuit, a transmitter selector and interface circuit, and various transmitters for transmitting an operating function to an electronic product. The electronics are operable for receiving an acoustic command, de-coding the acoustic command, and providing a function command to the transmitter selector and interface circuit. The function command is interfaced with a particular type of transmitter and transmitted optically or wirelessly to the electronic product. One or more human presence sensors may be operably coupled with the power control and alarm circuit to provide an assurance of human presence before enabling operation.

5 Claims, 3 Drawing Sheets

Related U.S. Application Data

(60) Provisional application No. 62/124,187, filed on Dec. 12, 2014.

(51) Int. Cl.
*H04W 4/38* (2018.01)
*A47G 9/00* (2006.01)
*H04L 29/08* (2006.01)
*H04W 4/80* (2018.01)

(56) References Cited

U.S. PATENT DOCUMENTS

| | | |
|---|---|---|
| 6,481,688 B1 | 11/2002 | Welling et al. |
| 8,792,059 B2 | 7/2014 | Kuciera et al. |
| 2006/0217987 A1 | 9/2006 | Swoda et al. |
| 2010/0302044 A1* | 12/2010 | Chacon .................... A61F 5/56 340/575 |
| 2012/0323090 A1 | 12/2012 | Bechtel et al. |
| 2014/0018609 A1* | 1/2014 | Howard ................ A61M 21/02 600/28 |
| 2015/0342529 A1 | 12/2015 | Gassoway et al. |
| 2016/0055842 A1 | 2/2016 | DeFranks et al. |

* cited by examiner

PILLOW REMOTE CONTROLLER USING ACOUSTIC COMMANDS

CROSS-REFERENCE TO RELATED APPLICATIONS

This continuation-in-part (CIP) application claims the benefit of priority to U.S. patent application Ser. No. 14/757,237 entitled PILLOW REMOTE CONTROLLER USING AUDIBLE COMMANDS filed on Dec. 10, 2015, which claims the benefit of priority to U.S. Provisional Application No. 62/124,187 filed on Dec. 12, 2014, the entire disclosures of which are incorporated herein by reference.

BACKGROUND OF THE INVENTION AND RELATED ART

Many electronic products today are operated by a cordless remote control device, commonly referred to as a "remote controller" or simply a "remote." Such electronic products include remote control toys, video games, televisions, cable and satellite signal boxes, audio and video components, air conditioning units, adjustable chairs and beds, and the like. The remote controllers for these electronic products are typically of the handheld type and include a touchscreen, keypad or function buttons for powering and operating the electronic product.

Voice-activated remote controllers are also available for certain electronic products. The voice-activated remote controllers available today are generally of the handheld type. Common consumer articles of manufacture, such as pillows, have also been designed to include means for remotely controlling electronic products. Those pillows, however, typically utilize a remote controller of the handheld type that includes a touchscreen, keypad or function buttons for powering and/or operating the electronic product.

BRIEF SUMMARY AND OBJECTS OF THE INVENTION

The present invention relates to a common consumer article of manufacture for remotely controlling an electronic product using acoustic commands to power and operate the electronic product. More particularly, the invention relates to a voice-activated remote controller operable to "power on" or "power off" an electronic product and to select, enable and/or activate various operating functions of the electronic product. The invention provides numerous advantages over existing remote controllers for electronic products, and especially, the known remote controllers for electronic products of the handheld type including a touchscreen, keypad or function buttons for powering and operating the electronic product.

A particular object of the present invention is to provide a human user with the ability to comfortably rest on a pillow while at the same time allowing the user to conveniently remotely control an electronic product using acoustic commands. Another advantageous object of the present invention is to provide a remote controller disposed within a common consumer apparatus, such as an otherwise conventional pillow, that responds to acoustic commands to transmit a control signal to power and/or operate an electronic product.

BRIEF DESCRIPTION OF THE DRAWING FIGURES

DETAILED DESCRIPTION OF EMBODIMENTS OF THE INVENTION

Figure 1:
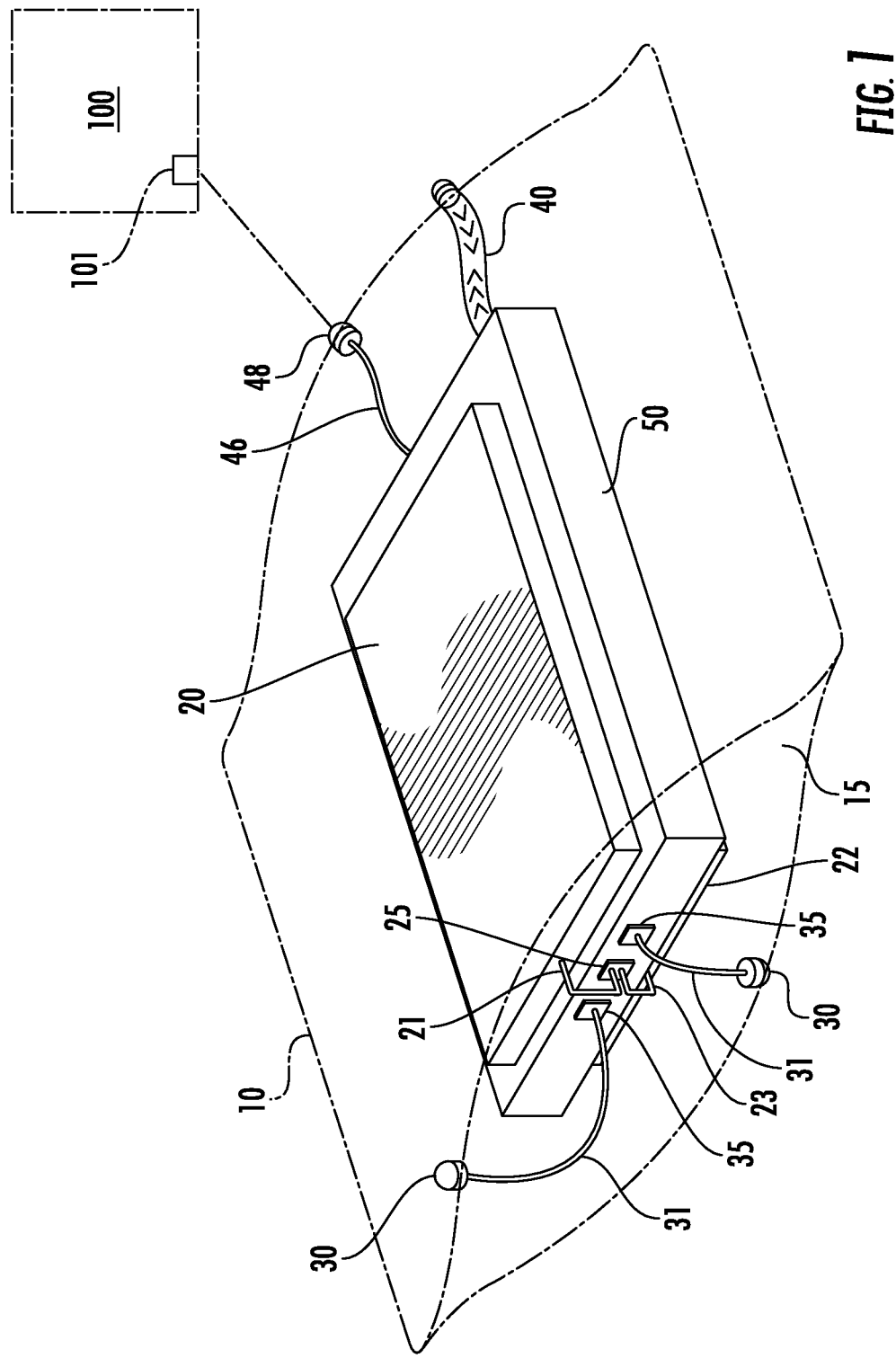
FIG. 1 is a perspective view showing an exemplary embodiment of a common consumer article of manufacture, namely a pillow, for remotely controlling an electronic product using acoustic commands according to the present invention.

The present invention relates generally to a common consumer article of manufacture for remotely controlling an electronic product using acoustic commands. In the exemplary embodiments illustrated in the accompanying drawing figures and described herein, the invention is a pillow having sensors and electronic components for remotely controlling an electronic product, and more particularly, for powering and/or operating an electronic product. The pillow defines a generally hollow, open interior compartment configured for housing the sensors and electronic components. In general, the sensors are operable for sensing the presence of a human user on the pillow and the electronic components are operable for receiving an acoustic command, de-coding the acoustic command, and providing a function command to a command transmitter to transmit an operating function to the electronic product.

The acoustic command is preferably in the form of a function-coded, audible command signal produced by a human user in physical contact with the pillow, for example a human user resting comfortably on the pillow. The acoustic command is received by the electronic components disposed within the pillow and de-coded. A corresponding function command is generated and provided to select and/or interface with a command transmitter operable to transmit a corresponding operating function to the electronic product. Preferably, the command transmitter has a verified, transmitted output power that is as low as possible without compromising its operational integrity. If desired, or if necessary, the verified, transmitted output power may be modulated and/or reduced, for example by a conventional signal transformer and/or signal conditioner.

The command transmitter in turn transmits (sends out) a modulated control signal associated with the acoustic command given by the user to a receiver of the electronic product to power and/or operate the electronic product. For example, the control signal may power-on or power-off, and/or select, enable and activate a particular operating function of the electronic product. Preferably, each acoustic command given by the user is unique and is associated with a particular operating function of the electronic product being controlled. In one embodiment, the acoustic command may be an audible command that is produced in a normal speaking manner, such as spoken numbers, words or sounds. In another embodiment, the acoustic command may be an audible command produced by humming, whistling, clapping, striking an object, or the like. Regardless of the manner in which the acoustic command is produced, it may be represented by any known audible command coding scheme. By way of example and not limitation, one suitable audible command coding scheme is known as the "count and hold for function control" coding scheme, also referred to herein as the "C+H" coding scheme.

The audible command C+H coding scheme can provide linear function control, also commonly referred to as continuous activation function control, of a number of different electronic products, devices and equipment. Regardless, linear (continuous activation) function control duplicates the action of causing a function command to continue to operate for the period of time that a human user depresses or holds down a key on a keypad or strikes (taps) an icon on a touchscreen. This audible command C+H coding scheme can be accomplished by a human user producing a predetermined number of relatively short, rapid sounds, such as by counting numbers, for example 1*2; 1*2*3; 1*2*3*4; etc., or by speaking a series of preselected words or sounds. Each number count, or each number of short words or sounds, produced by the user corresponds to a particular operating function of the electronic product, device or equipment to be controlled by the function command. Once the particular operating function corresponding to that function command is determined, and following a relatively short pause, the user produces a sustained (i.e., relatively long) audible command for a length of time desired by the user, or required by the electronic product, device or equipment, for the operating function to be performed.

An advantageous embodiment of an audible command count and hold (C+H) for function control coding scheme is illustrated by the following table of operating functions for an electronic product. By way of example and not limitation, a human user may desire a selection arrow in a menu screen of the electronic product to move up for a given period of time so that the selection arrow is associated with a different selection of the menu screen. In order to remotely control the "MOVE UP" operating function of the electronic product, the user speaks the initial number count 1*2. Following a brief pause, the user then speaks a sustained audible command, such as "PLEASE", for a period of time equal to the desired function activation time. Similarly, the user can remotely control any operating function of the electronic product by speaking a predetermined number count, or a predetermined number of short words or sounds, followed after a brief pause by a sustained audible command for a predetermined period of time. By way of example and not limitation, the user may select, enable and activate any desired operating function by making a predetermined number of sounds by pursing his or her lips six (6) times in rapid succession, for example (Pa*Pa*Pa*Pa*Pa*Pa), pausing momentarily, and then making the same sound or a different sound, for example Paaaaaa, for a predetermined period of time. As will be readily understood and appreciated by those skilled in the art, a predetermined activation code may also be used to select, enable and activate two or more operating functions simultaneously.

| OPERATING FUNCTION | INITIAL NUMBER COUNT | PAUSE | SUSTAINED AUDIBLE ACOUSTIC COMMAND |
|---|---|---|---|
| MOVE UP | 1*2 | — | PLEASE (for a desired function activation time) |
| MOVE DOWN | 1*2*3 | — | PLEASE (for a desired function activation time) |
| MOVE LEFT | 1*2*3*4 | — | PLEASE (for a desired function activation time) |
| MOVE RIGHT | 1*2*3*4*5 | — | PLEASE (for a desired function activation time) |
| (ANY FUNCTION) | Pa*Pa*Pa*Pa*Pa*Pa | — | Paaaaaa (for a desired function activation time) |

A preselected number, sound or word that produces an immediate audible noise can be used so as to form a "quick rise time", followed by a sudden silence so as to form a "quick fall time." By way of example and not limitation, a number, sound or word beginning with the letter "B", "P" or "M" may be used. It is believed that the letter "P" is particularly well suited for use with an activation code of the present invention. A number, sound or word beginning with one of the aforementioned letters is annunciated with the lips being closed at the beginning of the word, followed by a burst of sound after the lips are opened.

Another example of an audible command coding scheme that may be employed with the present invention is known as the "count, count and hold for function control" coding scheme, also referred to herein as the "CC+H" coding scheme. With the audible command CC+H coding scheme, the selection of a given function control is made by sounding out two (2) separate counts. A user sounds out a first count consisting of a number that represents a particular zone, such as a certain group of function keys on a keypad of a remote controller. After a brief pause, the user sounds out a second count consisting of a number that represents a particular function key from the keys within the zone of function keys previously selected by the user with the first count. After another relatively short pause, the user makes a sustained sound for a duration of time that a particular operating function is desired to be performed, or alternatively, is required by the electronic product to be active. The audible command CC+H coding scheme is to be used to provide ease of control when the remote controller has a relatively large number of function keys or operating functions.

Either of the audible command C+H coding scheme and the audible command CC+H coding scheme described herein provides linear (continuous activation) function control and may employ a feature to allow a user to pause any number of times, for example to catch his or her breath, while sounding out the sustained sound that controls the period of time that the selected operating function is active so that the selected operating function remains selected and is not interrupted. In some cases, there may be a relatively short time delay before the activation of an operating function associated with a user controlling a particular electronic product. Regardless, the present invention may be used for remotely controlling the different operating functions in various application of numerous different electronic products, such as: a remote control toy, a video game, a television; an audio or video component; an air conditioning unit; an electric door, window, curtain or blind; an adjustable bed, chair or the like, or any other electronic product, device or equipment suitable for being controlled by a remote controller configured in accordance with the present invention.

By example and not limitation, in an adjustable bed application, each adjustable function, such as "MOVE HEAD SECTION UP", "MOVE HEAD SECTION DOWN", "MOVE LEG/FEET SECTION UP", "MOVE LEG/FEET SECTION DOWN", "START/STOP MAS- SAGE", "INCREASE/DECREASE MASSAGE INTENSITY", etc., could be controlled by a specific number count, sound or word, or by a specific set of number counts, words or sounds, or alternatively by a uniquely coded audible command. Using the audible command C+H coding scheme, a user, for example a patient, would simply count out the number, or alternatively make the corresponding number of words or sounds, necessary to select a particular operating function, for example the "MOVE HEAD SECTION UP" operating function. Following a relatively brief pause, the user would then make a predetermined word or sound, for example a sustained audible sound command, for the duration of time that is desired for the head section to be moved in an upward direction.

The present invention may employ various other or additional features and enhancements. By way of example and not limitation, a time-out alarm and/or a disable (power-off) feature may be provided to sound an alarm and/or power-off certain electronic components contained within the electronics enclosure disposed within the interior compartment of the pillow after a predetermined duration of time from the time when the electronic components were powered-up or last activated. The time-out alarm and/or disable features could provide energy savings in the event that the pillow utilizes battery power and/or could provide a safety enhancement in the event that the user were to fall asleep on the pillow and the electronics potentially overheat. Alternatively, or in addition, an audible and/or vibrating alarm may be activated for a period of time whenever a pressure sensor provided on the pillow initiates the power-up and enabling process of certain of the electronic components. This audible and/or vibrating alarm feature could be activated just prior to the electronic components being enabled, and/or could be used to delay the electronic components being enabled for a predetermined time period once the audible and/or vibrating alarm is activated.

The accompanying drawing figures illustrate exemplary embodiments of the present invention that will now be described in greater detail. FIG. 1 shows a pillow depicted generically in phantom lines and indicated generally by reference character 10. Pillow 10 is operable for remotely controlling an electronic product likewise depicted generically in phantom lines in FIG. 1 and indicated generically by reference character 100. The electronic product 100 may be any electronic product, device, equipment, apparatus, system, or the like having means for being remotely controlled in any manner, such as for being powered and/or operated by means of a conventional remote controller. Examples of electronic products 100 suitable for being remotely controlled by pillow 10 include a remote control toy, a video game, a television, an audio or video component (e.g., a stereo, audio receiver, cassette player, CD player, video player, DVD, etc.), a cable or satellite signal box, an air conditioning unit, an electric door, window, curtain or blind, an adjustable bed or chair, and the like. Pillow 10 may have any desired size and/or shape suitable for defining a generally hollow, open interior compartment 15 configured for housing an electronics enclosure 50 disposed within the pillow 10. If desired, the interior compartment 15 of the pillow 10 may further house one or more sensors for activating certain electronic components contained within the electronics enclosure 50, as will be described.

As shown in FIG. 1, a top pressure sensor 20 and a bottom pressure sensor 22 preferably opposite the top pressure sensor 20 are disposed within the interior compartment 15 defined by the pillow 10. A cable 21 containing one or more conductors (not shown) electrically couples the top pressure sensor 20 with the electronics enclosure 50. Likewise, a cable 23 electrically couples the bottom pressure sensor 22 with the electronics enclosure 50. For purposes of convenience, simplicity of design and space economy, the cables 21, 23 may each be provided with a connector, coupler or plug that electrically couples the top pressure sensor 20 and the bottom pressure sensor 22, respectively, with the electronics enclosure 50 through one or more corresponding connectors, couplers or jacks 25 provided on the electronics enclosure 50. In this manner, the top pressure sensor 20 and the bottom pressure sensor 22 may be modular components capable of being readily removed and repaired or replaced. By way of example and not limitation, the top pressure sensor 20 and the bottom pressure sensor 22 are operable to detect a displacement due to the weight of a human user resting his or her head on the pillow 10, and in response, to power-up certain electronic components contained within the electronics enclosure 50. If desired, the pressure sensors 20, 22 may be enabled for wireless communications with the certain electronic components contained within the electronics enclosure 50, such as through Bluetooth, Radio Frequency (RF) or Near Field Communications (NFC), so that the cables 21, 23 can be eliminated.

As shown in FIG. 1, one or more human presence sensors 30 are also operably coupled with the electronics enclosure 50. The human presence sensor(s) 30 may be disposed within the interior compartment 15 defined by the pillow 10, or alternatively, may be disposed on the exterior of the pillow 10, as shown herein, depending on the type of sensor 30 employed. By way of example and not limitation, the human presence sensor(s) 30 may be a thermal heat sensor, a motion sensor, an imaging sensor, an infrared proximity sensor, or equivalent. Regardless, each sensor 30 is operable to detect the presence of a human user as opposed to an object so as to determine whether a user is actually present at the pillow 10, or alternatively, that an object, for example a book, placed on the pillow 10 is being sensed by one or both of the pressure sensors 20, 22. In this manner, the human presence sensor(s) 30 can prevent the pressure sensors 20, 22 from inadvertently activating the certain electronic components contained within the electronics enclosure 50 when a human user is not actually present and resting his or her head on the pillow 10. If desired, the one or more human presence sensor(s) 30 may be positioned around the perimeter of the pillow 10 so that the presence of a human user is consistently and accurately detected.

The exemplary embodiment illustrated in FIG. 1 depicts a pair of human presence sensors 30 each having a cable 31 containing one or more conductors (not shown) for electrically coupling the respective human presence sensor 30 with the electronics enclosure 50. As previously described with reference to the pressure sensors 20, 22, cables 31 may be provided with a connector, coupler or plug that electrically couples the respective sensor 30 with the electronics enclosure 50 through a corresponding connector, coupler or jack 35 provided on the electronics enclosure 50. In this manner, the human presence sensor(s) 30 may be a modular component capable of being readily removed and repaired or replaced. If desired, the human presence sensor(s) 30 may be enabled for wireless communications with the electronics enclosure 50, such as through Bluetooth, Radio Frequency (RF) or Near Field Communications (NFC), so that the cables 31 can be eliminated.

As also shown in FIG. 1, a generally hollow, relatively flexible audio conduction conduit 40 extends between the exterior of the pillow 10 and the electronics enclosure 50 disposed within the interior compartment 15 of the pillow 10. Conduit 40 is operable for conducting sound from the ambient environment around the exterior of the pillow 10 into the interior of the electronics enclosure 50, and conversely, from the interior of the electronics enclosure 50 to the ambient environment around the exterior of the pillow 10. As such, the conduit 40 preferably terminates on the exterior surface of the pillow 10 at one end and at the other end preferably terminates at an opening in the electronics enclosure 50 so as to provide a passageway for sound to travel between the ambient environment around the pillow 10 and the interior of the electronics enclosure 50. A microphone 42 (FIG. 2) operable for receiving an acoustic command may be located at any suitable location. Preferably, however, microphone 42 is located within the electronics enclosure 50 as part of the electronics components, as depicted in FIG. 2.

In addition, a speaker (not shown) may also be provided that is electrically and operably coupled with the certain electronic components contained within the electronics enclosure 50. If utilized, the speaker may be provided at any suitable location, but preferably is located within the electronics enclosure 50. If desired, a conventional amplifier may also be provided for the microphone 42 and/or the speaker. In this manner, an acoustic command from a human user can be channeled from the ambient environment around the exterior of the pillow 10 through the conduit 40 to the electronic components contained within the electronics enclosure 50. Conversely, an audio signal, such as an alarm or a pre-recorded audio message, can be channeled from the electronic components contained within the electronics enclosure 50 through the conduit 40 to the ambient environment around the exterior of the pillow 10.

As further shown in FIG. 1, a cable 46 containing one or more conductors (not shown) extends between the electronics enclosure 50 and a command transmitter 48 located at the exterior surface of the pillow 10. The purpose and function of the command transmitter 48 will be described in greater detail hereinafter. Regardless, the command transmitter 48 may be positioned at a single location on the exterior of the pillow 10, as shown in FIG. 1, or alternatively, may be positioned at multiple locations on the exterior of the pillow 10 depending on the particular type of transmitter being employed. In one advantageous embodiment, command transmitter 48 is a light-emitting-diode (LED) transmitter, such as an infrared LED, fiber optic LED or focused LED, transmitter that is positioned within a substantially translucent, semi-transparent or transparent medium extending around an outer perimeter of the pillow 10. Regardless, command transmitter 48 is operably coupled with a command receiver 101 provided on the electronic product 100, as will be described in greater detail hereinafter.

Figure 2:
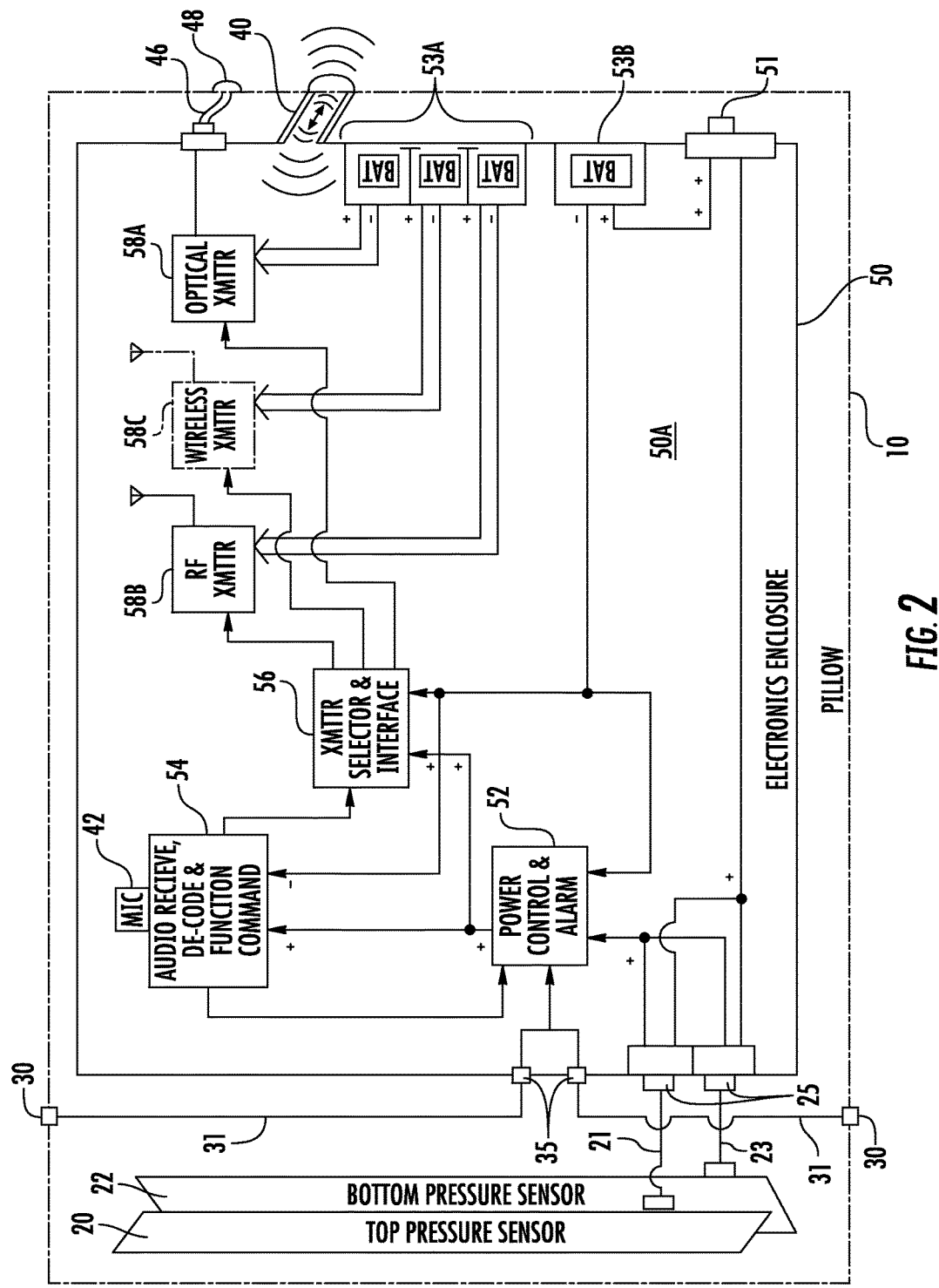
FIG. 2 is a schematic diagram illustrating an exemplary embodiment of various sensors and electronic components of the pillow remote controller of FIG. 1.

FIG. 2 is a schematic diagram illustrating an exemplary embodiment of the various sensors and electronic components of the pillow remote controller shown in FIG. 1. As previously described with reference to FIG. 1 and illustrated schematically in FIG. 2, the top pressure sensor 20 and the bottom pressure sensor 22 disposed within the interior compartment 15 of the pillow 10 are electrically and operably coupled with the electronics enclosure 50 through the corresponding cables 21, 23 that extend between the pressure sensors 20, 22 and their corresponding connectors, couplers or jacks 25 located on the exterior of the electronics enclosure 50. As previously described with reference to FIG. 1 and illustrated schematically in FIG. 2, the one or more human presence sensors 30 disposed on the pillow 10 are electrically and operably coupled with the electronics enclosure 50 through the corresponding cables 31 that extend between the sensors 30 and their corresponding connectors, couples or jacks 35 located on the exterior of the electronics enclosure 50. The audio conduction conduit 40 previously described with reference to FIG. 1 is operably coupled between the ambient environment around the exterior of the pillow 10 and the electronics enclosure 50. Furthermore, the command transmitter 48 previously described with reference to FIG. 1 is electrically and operably coupled with the electronics enclosure 50 through the corresponding cable 46 that extends between the exterior of the pillow 10 and the electronics enclosure 50.

Preferably, electronics enclosure 50 is formed from a relatively rigid material, such as hard plastic, so as to protect the electronic components housed therein. The electronics enclosure 50 should have a low height profile along with a suitable width and length relative to the size of the pillow 10. Electronics enclosure 50 may include a power-on, power-off switch 51 mounted on an exterior surface thereof that is accessible through the pillow 10. Regardless, the certain electronic components contained within the electronics enclosure 50 are operable for receiving an acoustic command from a human user, de-coding the acoustic command, and generating and assigning a function command corresponding to the acoustic command. Other electronic components within the electronics enclosure 50 are further operable for selecting a suitable transmitter (or alternatively, for selecting multiple transmitters to control multiple electronic products), if necessary, and/or for interfacing with the command transmitter 48 to transmit the function command in the form of a modulated control signal to the electronic product 100 to be remotely controlled by the pillow 10. If desired, the electronic components contained within the electronics enclosure 50 may be disposed on a common printed circuit board (PCB) 50A. Regardless, as illustrated schematically and described herein with reference to FIG. 2, the electronic components include a POWER CONTROL & ALARM circuit 52 that is electrically coupled with the pressure sensors 20, 22 and operable for providing power to the other electrical components and circuits of the pillow remote controller.

In one advantageous embodiment, the one or more transmitters that transmit the function command in the form of a modulated control signal are powered by one or more power supplies, such as internal batteries 53A. POWER CONTROL & ALARM circuit 52 receives its electrical power from the top pressure sensor 20 and/or the bottom pressure sensor 22 that indicates a user is resting his or her head on the pillow 10 and powers-up in response thereto. Once powered-up, the POWER CONTROL & ALARM circuit 52 queries an electrical signal input from the one or more human presence sensors 30 to determine whether a human user is present. In the event that circuit 52 does not receive an electrical signal input from a human presence sensor 30, or determines from the electrical input signal that a user is not present, circuit 52 produces an audible warning alarm and/or subsequently disables power to itself after a predetermined period of time as a precautionary measure to prevent unnecessary electrical power consumption of its circuitry and possible overheating of the sensors 20, 22, 30. Conversely, when the presence of a human user on the pillow 10 is determined from the electrical input signals of the sensors 20, 22, 30, circuit 52 then provides electrical power from a power supply, such as internal battery 53B electrically coupled to power switch 51, to the other electronic components and circuits of the pillow remote controller Thus, the human presence sensor(s) 30 and the POWER CONTROL & ALARM circuit 52 cooperate to prevent powering-up and enabling of the other electronic components and circuits that are controlled by circuit 52 whenever a human user is not present. This feature provides assurance that the pillow remote controller will not function without a human user resting his or her head on the pillow 10. In the embodiment shown in FIG. 2, a single internal battery 53B is provided to power the POWER CONTROL & ALARM circuit 52 and the other electronic components and circuits, while three (3) separate internal batteries 53A are provided to power the one or more transmitters that transmit an operating command to the receiver 101 of the electronic product 100, as will be described.

The other electronic components and circuits contained within the electronics enclosure 50 include an AUDIO RECEIVE, DE-CODE & FUNCTION COMMAND circuit 54 that is electrically coupled with and powered by the POWER CONTROL & ALARM circuit 52 when a human user is present and resting his or her head on the pillow 10. AUDIO RECEIVE, DE-CODE & FUNCTION COMMAND circuit 54 is operable for receiving an acoustic command from the user through the audio conduction conduit 40 by means of the microphone 42. Preferably, the acoustic command is converted to an electrical signal by the microphone 42 and may be accompanied by a signal-boosting amplifier, all being a part of the AUDIO RECEIVE, DE-CODE & FUNCTION CONTROL COMMAND circuit 54 contained within the electronics enclosure 50. The electrical signal corresponding to the acoustic command is then de-coded by the AUDIO RECEIVE, DE-CODE & FUNCTION COMMAND circuit 54. Regardless, circuit 54 receives and de-codes the acoustic command according to a predetermined logic, such as the audible command count and hold (C+H) for function control coding scheme previously described. Circuit 54 then generates and assigns a function command corresponding to the acoustic command received from the user.

The electronic components contained within the electronics enclosure 50 further include a XMTTR SELECTOR & INTERFACE circuit 56 that is likewise powered by the POWER CONTROL & ALARM circuit 52 when a user is present and resting his or her head on the pillow 10. Circuit 56 is operably coupled with the AUDIO RECEIVE, DE-CODE & FUNCTION COMMAND circuit 54. In the event that the electronics enclosure contains multiple transmitters, circuit 56 selects a suitable transmitter for transmitting a modulated control signal for an operating function corresponding to the function command assigned by circuit 54 to the electronic product 100 to be remotely controlled by the pillow 10. By way of example and not limitation, the circuit 56 may determine that the function command generated and assigned by AUDIO RECEIVE, DE-CODE & FUNCTION COMMAND circuit 54 corresponds to an operating function for a television 100. As a result, the XMTTR SELECTOR & INTERFACE circuit 56 selects the OPTICAL XMTTR 58A and interfaces the function command assigned by circuit 54 with the corresponding operating function of the television 100 to produce a modulated control signal to be transmitted to the command receiver 101 of television 100 by the OPTICAL XMTTR 58A. In a preferred embodiment, the OPTICAL XMTTR 58A provides a modulated infrared control signal, typically in the form of a series of infrared light pulses, via cable 46 to a light-emitting-diode (LED) of the command transmitter 48. The LED of the command transmitter 48 in turn transmits the modulated infrared control signal corresponding to the desired operating function to the command receiver 101 of television 100.

In the event that the function command generated and assigned by circuit 54 corresponds to an operating function of an electronic product 100 that is remotely controlled by a radio frequency (RF) signal, XMTTR SELECTOR & INTERFACE circuit 56 selects the RF XMTTR 58B and interfaces the function command with the corresponding operating function of the electronic product 100 to produce a modulated RF control signal. The XMTTR SELECTOR & INTERFACE circuit 56 may also be configured to interface the function command received from the AUDIO RECEIVE, DE-CODE & FUNCTION COMMAND circuit 54 with a wireless signal and select WIRELESS XMTTR 58C to transmit an operating function corresponding to the function command to an electronic product 100 that is remotely controlled by a modulated wireless control signal, such as by Bluetooth, Near Field Communication (NFC) or other wireless communication. In the event that the RF XMTTR 58B and/or the WIRELESS XMTTR 58C are utilized to transmit the operating function to the electronic product 100, the command transmitter 48 is typically by-passed and not utilized to transmit an optical signal (e.g., modulated infrared control signal) to the electronic product 100. The selection of OPTICAL XMTTR 58A, RF XMTTR 58B and/or WIRELESS XMTTR 58C depends on which particular electronic product 100 is desired to be controlled. In FIG. 2 it is important to note that the transmitter selector (and thus the transmitter selection process) of the XMTTR SELECTOR & INTERFACE circuit 56 is not needed when only one transmitter is available and/or when only one electronic product 100 having a single type of receiver 101 is to be controlled.

Figure 3:
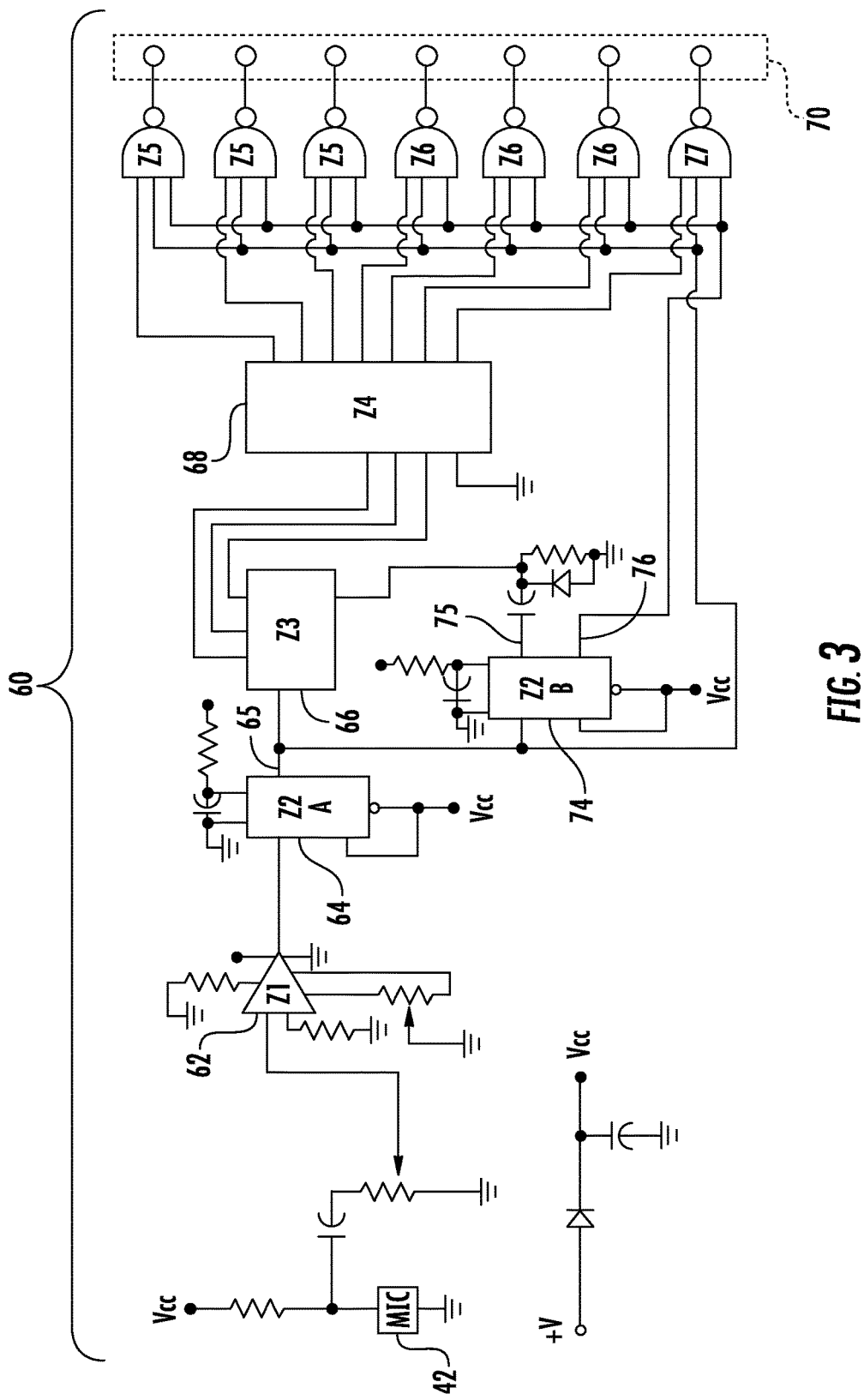
FIG. 3 is a wiring diagram showing an exemplary embodiment of an electrical circuit for the electronic components of FIG. 2 disposed within the pillow remote controller of FIG. 1.

FIG. 3 is a wiring diagram illustrating an exemplary embodiment of an electrical circuit 60 for the electronic components of FIG. 2 disposed within the pillow remote controller of FIG. 1. More particularly, FIG. 3 depicts a wiring diagram of an exemplary embodiment of the AUDIO RECEIVE, DE-CODE AND FUNCTION COMMAND circuit 54 illustrated in FIG. 2. Preferably, the circuit 54 uses the audible command C+H coding scheme previously described. As shown and described herein, circuit 54 preferably operates in the following manner and according to the methodology described herein. First, the acoustic command signal produced by the user is received at the microphone 42 through the audio conduction conduit 40 (FIG. 2) and is optionally boosted-up (amplified) by an amplifier circuit Z1, indicated in FIG. 3 by reference character 62. The amplified signal is next provided to a first timing circuit Z2A, indicated in FIG. 3 by reference character 64. In one exemplary embodiment, first timing circuit 64 is a mono-stable multi-vibrator with timing sufficient to create a constant high at the output 65 when a continuous audio input signal is received. Conversely, the output 65 will go low when the audio input signal is interrupted, or ceases. Since each single syllable word or syllable spoken creates a continuous sound for its duration, one positive level pulse will be generated at that output 65 for the entire length of time that each single syllable word or syllable is spoken. Therefore, the number of single syllable words or syllables spoken will cause a corresponding number of positive level pulses to be generated at the output 65 of first timing circuit 64.

The output 65 is sent into a pulse counter circuit Z3, indicated in FIG. 3 by reference character 66. The pulse counter circuit 66 produces a binary output which in turn is sent into a decoder circuit Z4, indicated in FIG. 3 by reference character 68. Decoder circuit 68 then selects one of a plurality of outputs (making it go high) that is determined by the number of single syllable words or syllables that are spoken. Each output of the decoder circuit 68 goes to a corresponding triple input "nand gate" Z5, Z6 and Z7. In turn, each Z5, Z6 and Z7 "nand gate" output is connected to one of a corresponding plurality of composite output command lines, indicated in FIG. 3 by reference character 70. In contrast, a second timing circuit Z2B, indicated in FIG. 3 by reference character 74, has a longer timeout period than the timeout period of the first timing circuit Z2A indicated in FIG. 3 by reference character 64. When the initial pulse in a series of pulses from the output 65 of first timing circuit 64 (Z2A) occurs, the positive-going edge of that initial pulse causes the output 75 of the second timing circuit 74 (Z2B) to go high. The high output 75 of second timing circuit 74 (Z2B) is then fed into a differentiating network, which produces a positive voltage pulse at its output. The positive voltage pulse at the output of the differentiating network is fed into the reset input of the pulse counter circuit 66, and thereby causes the counter of circuit 66 to reset to zero before it begins to again count a series of pulses representing spoken single syllable words or syllables. The remainder of the pulses in the series of pulses maintain the output 75 of the second timing circuit 74 (Z2B) high, and no further positive voltage pulse occurs to reset the counter of circuit 66 for the duration of that series of pulses. The output 75 of the second timing circuit 74 (Z2B) remains high for the duration because it has a longer timeout period, and is being retriggered by the positive-going edges of the remaining pulses in that series of pulses.

The pulse counter circuit 66 is triggered (incremented) on the negative-going edge of the pulses. Therefore, the positive-going edge of the initial or "first pulse only" in a series of pulses resets the counter of circuit 66. Thereafter, the falling or negative-going edges of all of the pulses in that series of pulses causes the count of the pulse counter circuit 66 to increment (count up) to a value equal to the number of single syllable words or syllables in that series of pulses. The "nand gate" inputs from the output 76 of the second timing circuit 74 (Z2B) insures that the command function selection occurs only after all of the pulses for a series of single syllable words or syllables are made and the counting is completed. The "nand gate" inputs from the output 65 of circuit 64 (Z2A) causes the selected command function to occur only for the duration of time of the follow-up sustained sound which comes at the end of the pause that follows the audible command counting. Thus, the "nand gate" outputs provide a "sinking" technique (pulling inputs low) for controlling inputs of other electronic circuitry.

The circuit arrangement shown in FIG. 3 and described herein is an example of a suitable circuit for use with the present invention, and particularly, for use with the count and hold (C+H) for function control coding scheme previously described However, any number of different circuit arrangements may be employed to accomplish various objectives of the present invention without departing from its intended broad scope. In particular, other and different applications utilizing the same electronic circuitry and additional enhancements, including the "time-out" alarm and "disable" circuits previously described, are envisioned. By way of example and not limitation, any application utilizing a feature that the system will not disarm as long as a user continues to make acoustic commands is within the intended broad scope of the present invention. Furthermore, various types of transmitters for transmitting a modulated control signal for an operating function are envisioned for use with the invention, including any electrical, optical, wireless, magnetic and/or electromagnetic transmitter, such as RF transmitters, Infrared transmitters, Bluetooth transmitters and Near Field Communication (NFC) transmitters.

That which is claimed is:

1. A pillow configured for use by a human user and operable for remotely controlling an electronic product using an acoustic command produced by the human user, the pillow comprising:
    a generally hollow, open interior compartment within the pillow;
    an electronics enclosure disposed within the interior compartment of the pillow, the electronics enclosure configured for containing electronic components therein, the electronic components being operable for receiving the acoustic command produced by the human user, de-coding the acoustic command, assigning a function command corresponding to the acoustic command, and providing the function command to a transmitter to transmit a control signal to the electronic product; and
    at least one sensor for determining the presence of the human user;
    wherein the acoustic command produced by the human user is in the form of a coded audible command that uses a coding scheme selected from the group consisting of a count and hold for function control ("C+H") coding scheme and a count, count and hold for function control ("CC+H") coding scheme;
    wherein the acoustic command comprises the human user producing an audible sound followed by a pause, followed by the human user producing a sustained audible sound for a desired duration of time; and
    wherein the electronic components comprise a first timing circuit for creating a constant high at an output of the first timing circuit when a continuous audio input signal is received, a pulse counter circuit for producing a binary output in response to the output of the first timing circuit, and a second timing circuit having a longer timeout period than a timeout period of the first timing circuit such that a positive-going edge of an initial pulse from the output of the first timing circuit causes an output of the second timing circuit to go high.

2. The pillow according to claim 1, wherein the at least one sensor comprises at least one pressure sensor that is operable for determining whether the human user is on the pillow.

3. The pillow according to claim 1, wherein the transmitter is selected from the group consisting of an optical transmitter, a radio frequency (RF) transmitter, and a wireless transmitter.

4. The pillow according to claim 1, wherein the binary output produced by the pulse counter circuit is provided to a decoder circuit operable for de-coding the acoustic command.

5. The pillow according to claim 1, wherein the electronic components contained within the electronics enclosure are not operable for recognizing a word command and remotely controlling the electronic product in response to recognizing the word command.

* * * * *